United States Patent
Brechner

(10) Patent No.: US 7,194,127 B2
(45) Date of Patent: Mar. 20, 2007

(54) METHOD AND SYSTEM FOR SEARCHING FOR IMAGES BASED ON COLOR AND SHAPE OF A SELECTED IMAGE

(75) Inventor: Eric L. Brechner, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/195,026

(22) Filed: Aug. 2, 2005

(65) Prior Publication Data

US 2005/0265635 A1    Dec. 1, 2005

Related U.S. Application Data

(60) Continuation of application No. 10/127,075, filed on Apr. 19, 2002, now Pat. No. 6,606,417, and a continuation of application No. 10/127,045, filed on Apr. 19, 2002, now Pat. No. 6,944,332, which is a division of application No. 09/295,018, filed on Apr. 20, 1999, now Pat. No. 6,477,269.

(51) Int. Cl.
    *G06K 9/00*    (2006.01)
(52) U.S. Cl. ............................ 382/165; 707/3
(58) Field of Classification Search ............... 382/100, 382/162, 165; 707/3
    See application file for complete search history.

(56) References Cited

U.S. PATENT DOCUMENTS

| | | | |
|---|---|---|---|
| 4,742,558 A | 5/1988 | Ishibashi et al. | |
| 4,954,972 A * | 9/1990 | Sullivan | 382/167 |
| 5,579,471 A | 11/1996 | Barber et al. | |
| 5,652,881 A | 7/1997 | Takahashi et al. | |
| 5,802,361 A | 9/1998 | Wang et al. | |
| 5,842,156 A | 11/1998 | Hong et al. | |
| 5,852,823 A | 12/1998 | De Bonet | |
| 5,915,250 A | 6/1999 | Jain et al. | |
| 5,987,459 A | 11/1999 | Swanson et al. | |
| 6,173,275 B1 | 1/2001 | Caid et al. | |
| 6,182,069 B1 | 1/2001 | Niblack et al. | |
| 6,240,423 B1 | 5/2001 | Hirata | |
| 6,345,274 B1 * | 2/2002 | Zhu et al. | 707/5 |
| 6,421,463 B1 | 7/2002 | Poggio et al. | |
| 6,430,312 B1 | 8/2002 | Huang et al. | |
| 6,728,406 B1 * | 4/2004 | Murao | 382/191 |

OTHER PUBLICATIONS

Yue et al. ("Texture image retrieval by universal classification for wavelet transform coefficients"; Lin Yue, Haitao Guo; Image Processing, 1997. Proceedings., International Conference on vol. 3, Oct. 26-29, 1997 pp. 220-223 vol. 3).*

* cited by examiner

*Primary Examiner*—Vikkram Bali
*Assistant Examiner*—Anand Bhatnagar
(74) *Attorney, Agent, or Firm*—Christensen O'Connor Johnson Kindness PLLC

(57) ABSTRACT

A method and system that allows a user to find images using a query by example is disclosed. Images similar to the selected image are retrieved based on color or shape. Each clip in a clip catalog is assigned a color metric and a wavelet, i.e., shape, metric. The selected clip is also assigned a color metric and a wavelet metric. Those clips that are most similar based on either the wavelet metric or the color metric are returned to the user.

20 Claims, 21 Drawing Sheets

FORWARD HAAR TRANSFORM EXAMPLE

| | A0 | A1 | A2 | A3 | A4 | A5 | A6 | A7 | A8 | A9 | A10 | A11 | A12 | A13 | A14 | A15 |
|---|---|---|---|---|---|---|---|---|---|---|---|---|---|---|---|---|
| INPUT SIGNAL | 1 | -2 | 3 | -4 | 3 | 4 | 2 | 2 | 2 | 2 | 4 | 3 | -4 | 3 | -2 | 1 |
| FORWARD HAAR | -0.707 | -0.707 | 4.95 | 2.828 | 2.828 | 4.95 | -0.707 | -0.707 | 2.121 | 4.95 | -0.707 | 0.0 | 0.0 | 0.707 | -4.95 | -2.121 |

AVERAGE COMPONENTS
$H_i = (A_{2*i} + A_{2*i+1}) / SQRT(2)$
WHERE $i = 0 \ldots 7$ DIFFERENCE COMPONENTS
$H_{8+i} = (A_{2*i} - A_{2*i+1}) / SQRT(2)$
WHERE $i = 0 \ldots 7$

*Fig. 5A.*

INVERSE HAAR TRANSFORM EXAMPLE

| | H0 | H1 | H2 | H3 | H4 | H5 | H6 | H7 | H8 | H9 | H10 | H11 | H12 | H13 | H14 | H15 |
|---|---|---|---|---|---|---|---|---|---|---|---|---|---|---|---|---|
| INPUT SIGNAL | -0.707 | -0.707 | 4.95 | 2.828 | 2.828 | 4.95 | -0.707 | -0.707 | 2.121 | 4.95 | -0.707 | 0.0 | 0.0 | 0.707 | -4.95 | -2.121 |
| INVERSE HAAR | 1 | -2 | 3 | -4 | 3 | 4 | 2 | 2 | 2 | 2 | 4 | 3 | -4 | 3 | -2 | 1 |

EVEN COMPONENTS
$A_{2*i} = (H_i + H_{i+8}) / SQRT(2)$
WHERE $i = 0 \ldots 7$

ODD COMPONENTS
$A_{2*i+1} = (H_i - H_{i+8}) / SQRT(2)$
WHERE $i = 0 \ldots 7$

*Fig. 5B.*

| INPUT SIGNAL | 1 | -2 | 3 | -4 | 3 | 4 | 2 | -2 | 2 | 2 | 4 | 3 | -4 | 3 | -2 | 1 |
|---|---|---|---|---|---|---|---|---|---|---|---|---|---|---|---|---|
| LEVEL 1 | -0.707 | -0.707 | 4.95 | 2.828 | 2.828 | 4.95 | -0.707 | -0.707 | 2.121 | 4.95 | -0.707 | 0.0 | 0.0 | 0.707 | -4.95 | -2.121 |
| LEVEL 2 | -1.0 | 5.5 | 5.5 | -1.0 | 0.0 | 1.5 | -1.5 | 0.0 | | | | | | | | |
| LEVEL 3 | 3.182 | 3.182 | -4.596 | 4.596 | | | | | | | | | | | | |
| LEVEL 4 | 4.5 | 0.0 | | | | | | | | | | | | | | |

*Fig. 5C.*

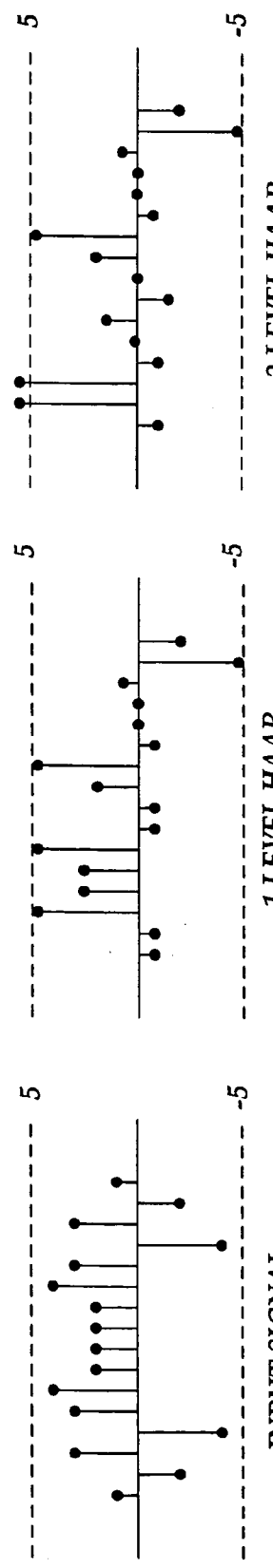
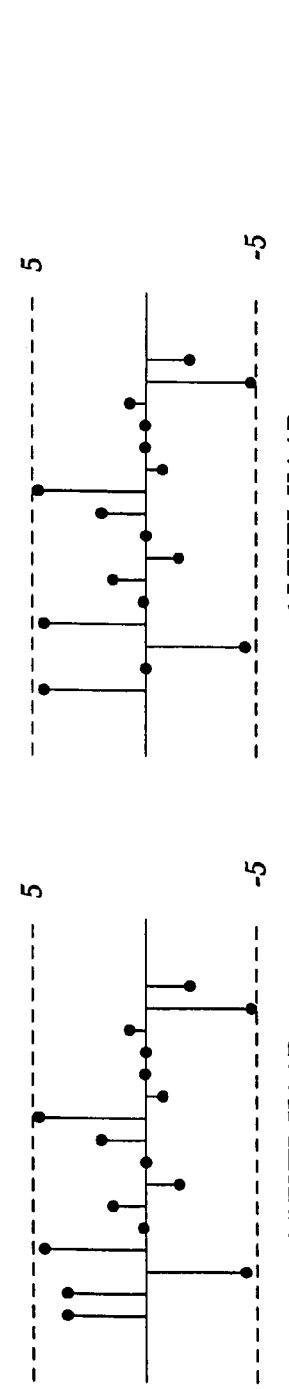
Fig. 5D.
Fig. 5E. INPUT SIGNAL
Fig. 5F. 1 LEVEL HAAR
Fig. 5G. 2 LEVEL HAAR
Fig. 5H. 3 LEVEL HAAR
Fig. 5I. 4 LEVEL HAAR

| SHELL 0 #0 | SHELL 1 #3 | SHELL 2 #8 | SHELL 3 #15 | SHELL 4 #24 | SHELL 5 #35 | SHELL 6 #48 | SHELL 7 #63 |
|---|---|---|---|---|---|---|---|
| SHELL 1 #1 | SHELL 1 #2 | SHELL 2 #7 | SHELL 3 #14 | SHELL 4 #23 | SHELL 5 #34 | SHELL 6 #47 | SHELL 7 #62 |
| SHELL 2 #4 | SHELL 2 #5 | SHELL 2 #6 | SHELL 3 #13 | SHELL 4 #22 | SHELL 5 #33 | SHELL 6 #46 | SHELL 7 #61 |
| SHELL 3 #9 | SHELL 3 #10 | SHELL 3 #11 | SHELL 3 #12 | SHELL 4 #21 | SHELL 5 #32 | SHELL 6 #45 | SHELL 7 #60 |
| SHELL 4 #16 | SHELL 4 #17 | SHELL 4 #18 | SHELL 4 #19 | SHELL 4 #20 | SHELL 5 #31 | SHELL 6 #44 | SHELL 7 #59 |
| SHELL 5 #25 | SHELL 5 #26 | SHELL 5 #27 | SHELL 5 #28 | SHELL 5 #29 | SHELL 5 #30 | SHELL 6 #43 | SHELL 7 #58 |
| SHELL 6 #36 | SHELL 6 #37 | SHELL 6 #38 | SHELL 6 #39 | SHELL 6 #40 | SHELL 6 #41 | SHELL 6 #42 | SHELL 7 #57 |
| SHELL 7 #49 | SHELL 7 #50 | SHELL 7 #51 | SHELL 7 #52 | SHELL 7 #53 | SHELL 7 #54 | SHELL 7 #55 | SHELL 7 #56 |

*Fig.6.*

SELECTED IMAGE

TOTAL WAVELET VALUE FOR 'Y' COEFFICIENTS = 830 + 1010 + 520 + 300 = 2660

*Fig.14A.*

*TARGET IMAGE 1*

*TOTAL WAVELET VALUE FOR 'Y' COEFFICIENTS= 830 + 1010 + 1010 + 300 = 3150*
*MATCHES WITH SELECTED IMAGE (UNDERLINED) = 830 + 300 = 1130*
*MATCH VALUE = 1130/3150 = .359*

*Fig.14B.*

TARGET IMAGE 2

**TOTAL WAVELET VALUE FOR 'Y' COEEFICIENTS = 830 + 1010 + 1010 + 520 = 3370
MATCHES WITH SELECTED IMAGE (UNDERLINED) = 830 + 1010 + 520 = 2360**
MATCH VALUE = 2360 / 3370 = .700

*Fig. 14C.*

| | |
|---|---|
| RED | 60.0 |
| ORANGE | |
| YELLOW | |
| YELLOW/GREEN | |
| GREEN | |
| GREEN/CYAN | |
| CYAN | |
| CYAN/BLUE | |
| BLUE | 40.0 |
| BLUE/PURPLE | |
| PURPLE | |
| PINK | |
| BROWN | 30.0 |
| WHITE | 75.0 |
| GRAY | |
| BLACK | |
| TRANSPARENT | 50.0 |

*SELECTED IMAGE*

*Fig. 15A.*

| | |
|---|---|
| RED | |
| ORANGE | |
| YELLOW | 25.0 |
| YELLOW/GREEN | |
| GREEN | |
| GREEN/CYAN | |
| CYAN | |
| CYAN/BLUE | |
| BLUE | 60.0 |
| BLUE/PURPLE | |
| PURPLE | |
| PINK | |
| BROWN | 30.0 |
| WHITE | 95.0 |
| GRAY | |
| BLACK | |
| TRANSPARENT | 50.0 |

TARGET IMAGE 1

BLUE MATCH = 40.0
BROWN MATCH = 30.0
WHITE MATCH = 75.0
TRANSPARENT MATCH = 50.0

TOTAL = 195.0
NORMALIZED TOTAL = 195.0/255 = .7647
EXPONENTIATED (FOURTH POWER) = .3420

*Fig.15B.*

| | |
|---|---|
| RED | 65.0 |
| ORANGE | |
| YELLOW | |
| YELLOW/GREEN | |
| GREEN | 65.0 |
| GREEN/CYAN | |
| CYAN | |
| CYAN/BLUE | |
| BLUE | |
| BLUE/PURPLE | |
| PURPLE | |
| PINK | |
| BROWN | 30.0 |
| WHITE | 65.0 |
| GRAY | |
| BLACK | |
| TRANSPARENT | 50.0 |

TARGET IMAGE 2

RED MATCH = 60.0
BROWN MATCH = 30.0
WHITE MATCH = 65.0
TRANSPARENT MATCH = 50.0

TOTAL = 205.0
NORMALIZED TOTAL = 205.0 / 255 = .8039
EXPONENTIATED (FOURTH POWER) = .4176

*Fig.15C.*

METHOD AND SYSTEM FOR SEARCHING FOR IMAGES BASED ON COLOR AND SHAPE OF A SELECTED IMAGE

CROSS-REFERENCE TO RELATED APPLICATIONS

This application is a continuation of patent application Ser. No. 10/127,045, filed Apr. 19, 2002 now U.S. Pat. No. 6,944,332, and patent application Ser. No. 10/127,075, filed Apr. 19, 2002, now issued as U.S. Pat. No. 6,606,417 B1, both of which are divisionals of patent application Ser. No. 09/295,018, filed Apr. 20, 1999, now issued as U.S. Pat. No. 6,477,269 B1.

BACKGROUND

With today's technology, computer users have easy access to thousands of digital images. As technology continues to advance, more and more computer users will have access to more and more images. However, as the number of images to which computer users have access increases, so does the difficulty in locating a particular image.

Attempts have been made to solve this problem. One solution is the use of keywords. There are several difficulties with the use of keywords in trying to locate an image. First, all images must be manually tagged. Second, some visual aspects of an image are hard to describe. Third, users must guess which keyword(s) were used to tag images of potential interest.

Based on the problems with keyword searching, other approaches have been used to describe images so that a database of images can be searched. One approach is to obtain a wavelet signature based on a wavelet decomposition to query by example. A wavelet signature describes the shape of objects located in an image First, the wavelet signature of a selected image that contains one or more features of interest to the user (such as an image of an object) is determined. Then, wavelet signatures are determined for all potentially similar images that may be of interest to the user contained in an image catalog (i.e., an image database) to be searched. Next, the wavelet signatures of the potentially similar images are compared with the wavelet signature of the selected image. The closer the wavelet signature of a potentially similar image is to the wavelet signature of the selected image, the greater the likelihood that the images are similar. Potentially similar images are ranked using this criteria and the result displayed, in order, to the user. There are some problems with this approach to image searching, for example, if an image is rotated, the original image and the rotated image will produce significantly different wavelet signatures.

Another approach to image searching employs color histograms. A color histogram provides general information about the color characteristics of an image. In this approach, the color histogram of a selected image that contains one or more features of interest to the user is determined. Then color histograms of all potentially similar images contained in an image catalog to be searched that may be of interest to the user are determined. The color histograms are compared, ranked and displayed, in order, to the user. There are also problems with this approach, for example, a color, a black and white, and a gray scale version of the same image will produce significantly different color histograms. Accordingly, there exists a need for an easy method to more accurately locate images that are similar to a selected image.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to a system, method, and computer-readable medium for finding images in an image catalog that are similar to a selected image based on color or shape. Shape similarity is determined by comparing a wavelet signature derived from the selected image to a wavelet signature derived from each image in the image catalog. Color similarity is determined by comparing the color signature of the selected image to the color signature of each image in the image catalog. A match value, or metric, is assigned for each of these comparisons. The images with the highest match value, i.e., closest match in either color or wavelet, i.e., shape, are returned to the user.

In accordance with other aspects of this invention, the wavelet signature is determined by: centering the image on a field; converting the image to a standard color space; normalizing the colors; performing a wavelet decomposition; determining coefficients for each color plane; and encoding the coefficients based on row/column and sign.

In accordance a further aspect of this invention, YIQ, a color model used in broadcast television, is the standard color space used for determining the wavelet signature.

In accordance with yet a further aspect of the present invention, the colors are normalized, preferably to vary from 0 to 1.

In accordance with still another aspect of this invention, the standard Haar transform is used for the wavelet decomposition.

In accordance with yet another aspect of this invention, 40 of the largest coefficients are stored for each color plane. Preferably, coefficients below a threshold value are not stored.

In accordance with other aspects of the present invention, the color signature for an image is determined by: blurring the image; converting the image to a standard color space; accumulating color pixels in buckets; computing pixel coverage for each of the color buckets; and encoding and storing coverage values for the colors with most coverage.

In accordance with further aspects of this invention, the color space used in determining the color signature is HSV (based on Hue, Saturation and Value elements).

In accordance with yet further aspects of this invention, coverage values are stored for the five colors with the most coverage. Preferably only colors with coverages above a threshold value are stored.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5A–5I illustrate Haar transforms;

FIG. 6 is a diagram of shells and a shell numbering scheme;

FIGS. 14A–14C illustrate exemplary wavelet signatures and metrics for a selected image and two target images; and FIGS. 15A–15C illustrate exemplary color signatures and metrics for a selected image and two target images.

DETAILED DESCRIPTION

The present invention is directed to a computer program for searching a clip catalog (i.e., a database) containing a plurality of image clips to find images that are similar to a selected image based on color and/or shape. The invention is a search tool designed for use on a computer, such as a personal computer or a network computer system running a multimedia application program that contains a catalog of clips, such as the Clip Gallery produced by Microsoft Corporation, Redmond, Wash.

Exemplary Computing Environment

Figure 1:
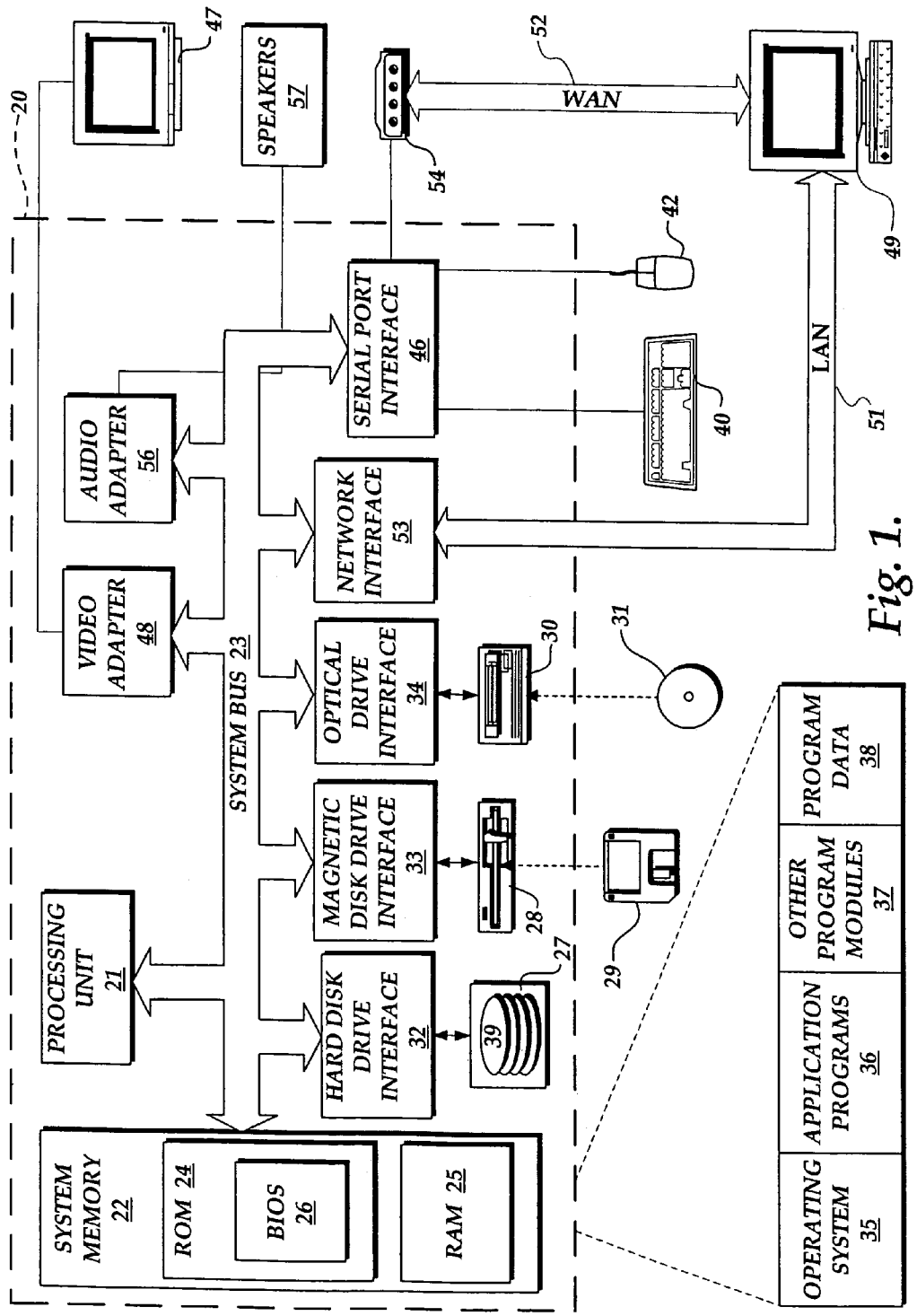
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from and writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. Preferably, the video card or adapter includes a 3D rendering engine implemented in hardware. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

The present invention, implemented on a system of the type illustrated in FIG. 1 and described above, allows a user to efficiently and effectively search a clip catalog to locate the clip or clips that most closely match what the user is seeking. As will be better understood from the following description, this is accomplished by a user selecting a clip, and invoking a command to find clips of similar color or shape.

Figure 2:
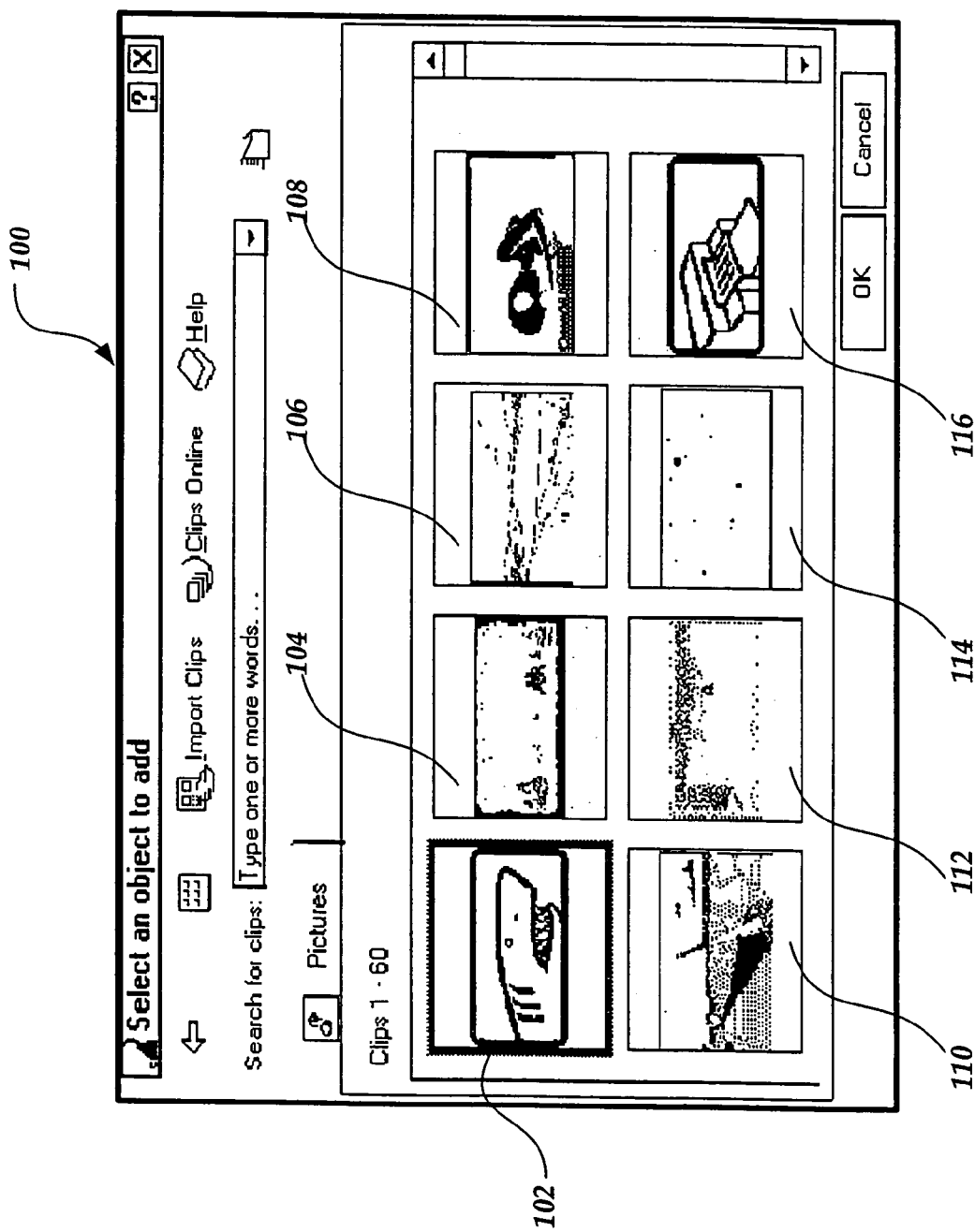
FIG. 2 is a sample Clip Gallery screen of results returned for a query of clips similar to a selected clip based on color or shape.

A Clip Gallery user interface 100 is illustrated in FIG. 2. The user interface 100 represents the display returned to a user after invoking a command to find. clips similar in color and shape to a selected clip 102. The display shows the return of resulting clips 104–116.

Determining Wavelet and Color Signatures

Figure 3:
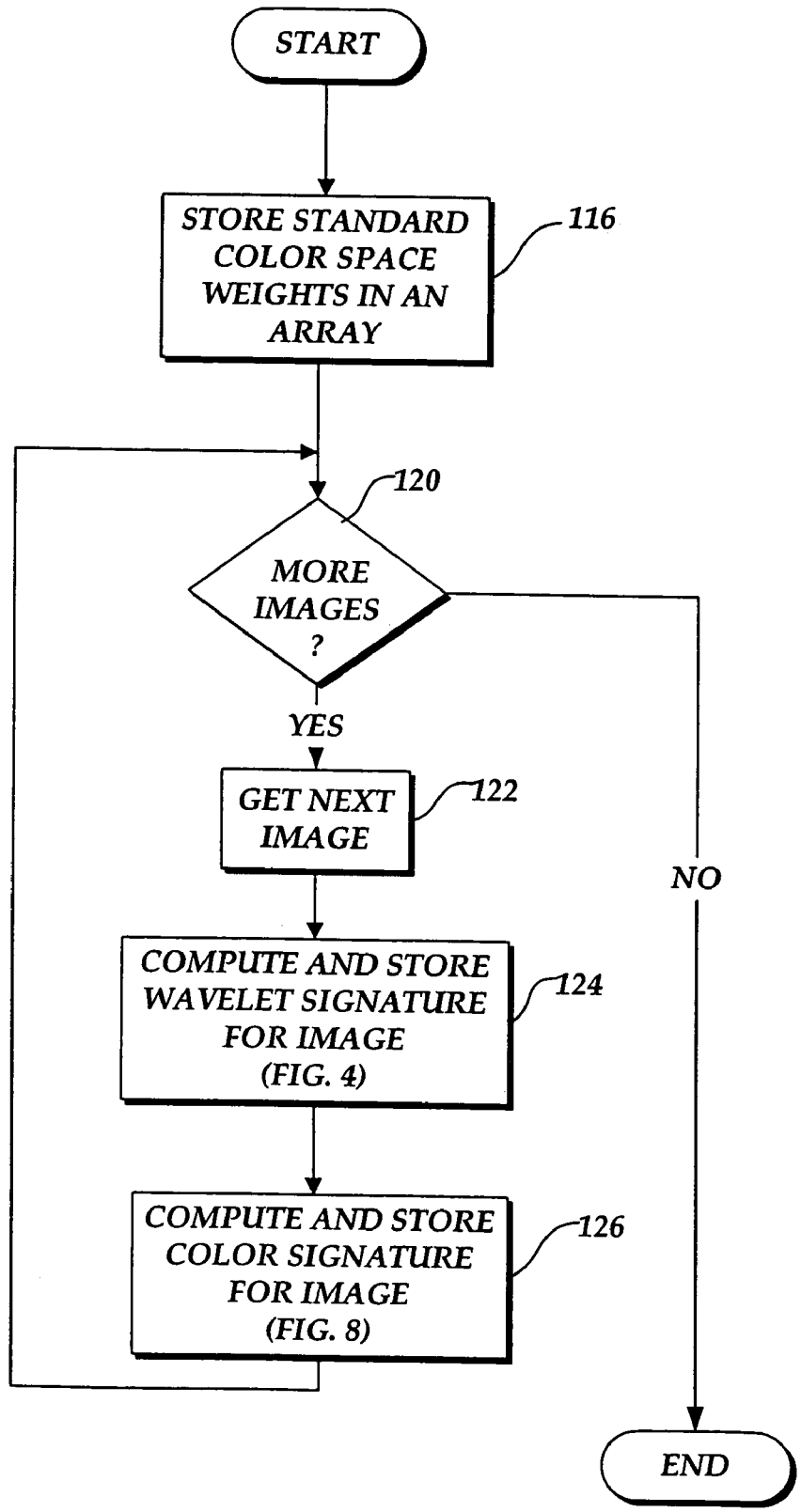
FIG. 3 is a flow diagram illustrating the overall logic for computing and storing wavelet and color signatures for all images in an image catalog.
Figure 7:
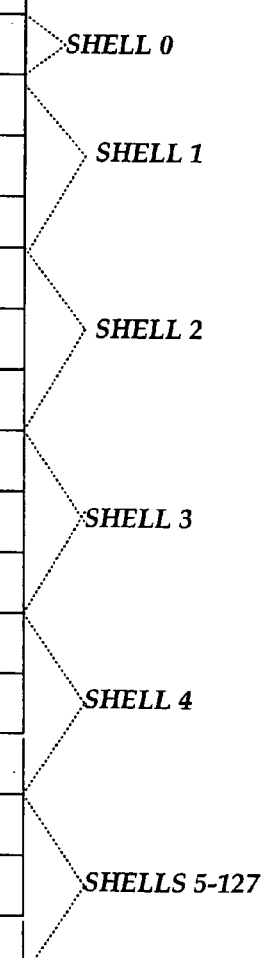
FIG. 7 is an exemplary array of shell weight values for a YIQ color space.

FIG. 3 is a flow diagram illustrating the overall logic for computing and storing wavelet signatures and color signatures for all of the images in an image catalog. The logic moves from a start block to block 116 where standard color space weight values, preferably YIQ, are stored in an array for fast retrieval. This array is a table of weights for each color channel ('Y', 'I', and 'Q') for each shell, and is illustrated in FIG. 7. The logic then moves to decision block 120 where a test is made to determine if there are more images. If so, the logic moves to block 122 where the next image in the image catalog is obtained. The logic then moves to block 124 where a wavelet signature is computed and stored for the image. The logic for computing and storing a wavelet signature for an image is illustrated in detail in FIG. 4 and described below. Next, in block 126, a color signature is computed and stored for the image. The logic for computing and storing a color signature for the image is illustrated in detail in FIG. 8 and described later. The logic then returns to decision block 120. The logic of blocks 120–126 is repeated until there are no more images in the image catalog that need to have wavelet and color signatures computed, at which point the logic of FIG. 3 ends. While the logic illustrated in FIG. 3 can be performed at any time in order to compute wavelet and color signature values for all of the images stored in an image catalog, alternatively, the wavelet and color signatures can be computed whenever an image is added to the clip catalog and whenever an image in the clip catalog is modified and the wavelet and color signatures stored for subsequent use in the manner described below.

Determining Wavelet Signatures

A wavelet signature is derived from a wavelet decomposition. The coefficients of the decomposition are stored into small signatures for each image. An image querying metric is computed from these signatures. The metric essentially compares how many significant wavelet coefficients the query has in common with potential target images. This metric requires very little storage for the signatures of the images. Comparisons of the metric are fast, thereby allowing for a rapid search of a database containing thousands of images.

Figure 4:
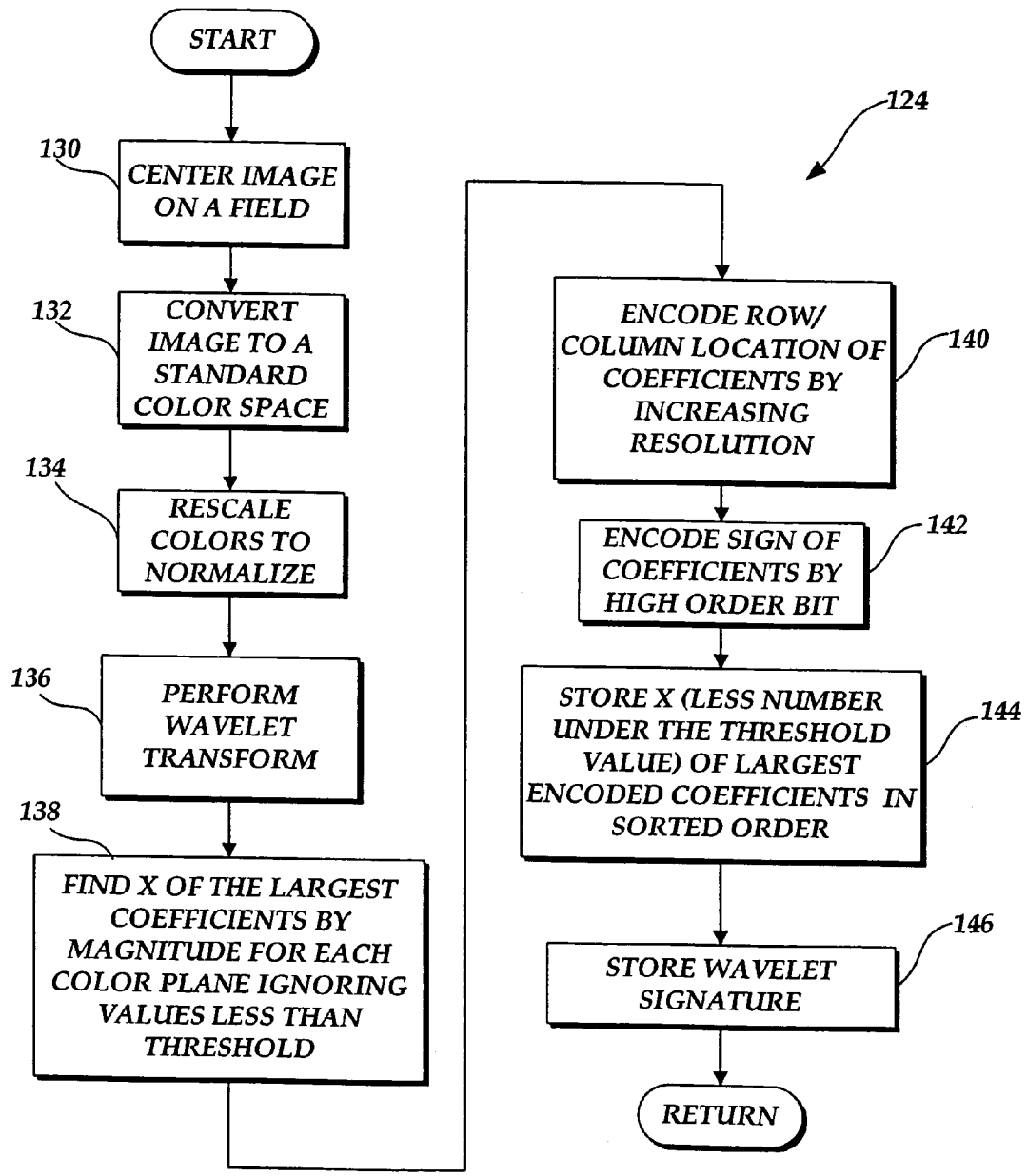
FIG. 4 is a flow diagram illustrating in detail the logic of computing and storing a wavelet signature for an image in accordance with the present invention.

The logic shown in FIG. 4 for computing a wavelet signature for an image moves from a start block to block 130 where the image is centered on a field, preferably white. Preferably, the field is 128×128 pixels. A 128×128 pixel field will accommodate thumbnails, which are representations of images, such as the ones that are displayed in the Clip Gallery user interface shown in FIG. 2. Still referring to FIG. 4, the logic next moves to block 132 where the image is converted to a standard color space, preferably YIQ. YIQ is a standard color model used by broadcast television based on brightness, color and tint. This standard is the preferred model because it most closely matches a user's perception of an image. Other color space standards, such as RGB (Red, Green, Blue) or HSVA (Hue, Saturation, Luminosity, Alpha) can also be used. Algorithms for converting an image to a standard color space, such as YIQ or RGB, are known to those skilled in the art of computer graphics, particularly with respect to the image processing aspect of computer graphics.

Returning to FIG. 4, colors are normalized by rescaling, preferably, to vary from values between 0 and 1. See block 134. Next, the logic moves to block 136 where a wavelet transform is performed on the normalized values. Preferably, the standard Haar wavelet transform is used because it is simple to implement and provides for fast computations. Other transforms may be used, and may even provide more accurate results, however, they will most likely be slower. The Haar wavelet transform is illustrated in detail in FIGS. 5A–5I and is described in detail later.

After performing the wavelet transform, the logic moves to block 138 where a specified number, X, of the largest coefficients by magnitude for each color plane are found. Preferably, the number of coefficients, X, is forty. For a 128×128 pixel image, there are $128^2$ or 16,384 different wavelet coefficients for each color channel ('Y', 'I', and 'Q'). It is preferable that the sequence be truncated with only the coefficients with the largest magnitude being used. This truncation accelerates the search and actually appears to improve the results because only the most significant features are considered, i.e., "noise" is removed. A truncated value of about 40 coefficients provides the preferred results in both accuracy and efficiency. Preferably, values falling below a threshold value are ignored. Therefore, at most forty coefficients will be found for each color channel. However, less than forty coefficients may be found because there may not be forty coefficients above the threshold value.

The logic next moves to block 140 where row/column locations of coefficients are encoded by increasing resolution. This is done using shells where each shell represents a resolution. FIG. 6 illustrates a scheme for ordering shells based on resolution, and is described in detail later. The signs of the coefficients are then encoded, preferably using the high order bit. The logic then moves to block 144 where the specified number, X, of the largest encoded coefficients are stored in sorted order. Using this scheme, only 240 bytes of storage are required to store the coefficient data for an image (40 coefficients for 3 color channels, with each coefficient requiring 2 bytes of storage, including 14 data bits and 1 sign bit). Next, in block 146, the wavelet signature is stored. The logic of FIG. 4 then ends, and processing is returned to FIG. 3.

Standard Haar Transform

Even though there are an infinite number of wavelet transforms, there are properties common to all wavelet transforms. Wavelet transforms decompose input signals (functions, images, etc.) into "average" and "difference" components. FIGS. 5A–5I illustrate how this is accomplished using the Haar transform.

Simply stated, the Haar transform uses two numbers, a and b. The average is defined as avg=(a+b)/2 and the difference is defined as diff=(a−b). For these numbers (avg and diff) to be useful, a capability must exist that allows for reconstruction of the original numbers from them. This reconstruction is possible because a=avg+(diff/2) and b=avg−(diff/2). In the Haar transform the average is defined as avg=(a+b)/sqrt(2) and the difference is defined as diff=(a−b)/sqrt(2), where sqrt(2) which is the square root of 2 or 1.41421, and is used to normalize the values. Defined this way the inverse process (the reconstruction of the original numbers) can be calculated in virtually the same way; a=(avg+diff)/sqrt(2) and b=(avg−diff)/sqrt(2). This type of computational symmetry is called orthogonality and is an important property shared by all wavelets.

An example, shown in FIGS. 5A and 5B, will help clarify these definitions. FIG. 5A illustrates the forward Haar transform on an input signal (or function). The forward Haar transform is defined by the average components determined by equation 1 and the difference components determined by equation 2:

$$H_i = (A_{2*i} + A_{2*i+1})/\text{sqrt}(2) \quad (1)$$

where i=0 ... (N/2)−1.

$$H_{(N/2)+1} = (A_{2*i} - A_{2*i+1})/\text{sqrt}(2) \quad (2)$$

where i=0 ... (N/2)−1.

The inverse Haar transform is defined by the even components determined by equation 3 and the odd components determined by equation 4:

$$a_{2*i} = (H_i + H_{i+(N/2)})/\text{sqrt}(2) \quad (3)$$

where i=0 ... (N/2)−1.

$$a_{2*i+1} = (H_i - H_{i+(N/2)})/\text{sqrt}(2) \quad (4)$$

where i=0 ... (N/2)−1.

In the example illustrated in FIGS. 5A and 5B, the Haar transform was run once (or one level) over the input signal. The difference component of the first level can be used to show where dramatic changes in the input signal occur. A large difference indicates a large change between input signal neighbors. Values near zero are indicative of input signal neighbors that are close to the same value and somehow similar. By running the Haar transform again on the first level average components change information can be generated about a larger part of the signal since the difference of two averages contains information about 4 input signal values. This process can be repeated until the average and difference components contain one element each. Each successive transform level provides courser frequency (change) information about a larger part of the input signal. To reconstruct the signal from the transform, the average and difference components of the coarsest level are used to generate the next coarsest average. The reconstructed average and its corresponding difference components are then used to reconstruct the next average. This is continued until the original signal is regenerated. The table shown in FIG. 5C shows the complete Haar transform for the example above.

Since average components can be reconstructed for a given level from the next coarsest level, only the difference components and the last level's average components need to be saved in order to reconstruct the entire input signal. FIG. 5C illustrates a natural ordering of the Haar transform data. This ordering not only makes it easy to find where a level begins, it also saves computer memory, which is an important consideration when computing the wavelet transform of a large image. This ordering is illustrated in FIG. 5D. The graphs shown in FIGS. 5E–5I summarize the discussion above.

FIG. 6 is a diagram illustrating shells used to store the encoded values of the highest coefficients. See block 144 of FIG. 4. FIGS. 14A–14C, described later, illustrate examples of coefficient values stored in a shell matrix, such as the one shown in FIG. 6. Referring to FIG. 6, the first shell, "Shell 0," 300 contains the average color coefficient for the image, and is surrounded by the next shell, "Shell 1," which is composed of three coefficients, 302, 304, and 306. The next shell, "Shell 2" surrounds "Shell 1". In this manner, each shell surrounds the previous shell. Each shell represents the next level of resolution, and is assigned a weight value. Preferable shell weight values are shown in FIG. 7. The weight values, as shown in FIG. 7, are stored in an array (block 116 of FIG. 3). The coefficient of "Shell 0" 300 is not weighted, i.e., has a weight value of 0. "Shell 0" 300 is ignored because it represents color averages not shape. For a 128×128 pixel image, the shells as shown in FIG. 6 would be in a 128×128 matrix. All coefficient values that are not among the largest coefficients, e.g., the largest forty coefficients, are assumed to be zero. Actual coefficient values may be maintained, or the largest (absolute value) coefficients may be stored as +1 or −1. The shell locations for the largest forty coefficients are sorted and stored in an array. For example, if the largest coefficient were stored in cell number two (304 in "Shell one"), a two (for cell number 2) would be stored in the array, along with the coefficient value (or +1 or −1). The high order bit is used to indicate whether the coefficient is a negative value. By storing the top 40 coefficients in a sorted array, a linear comparison can be made between the selected image and a target image, thereby minimizing the computation time required for comparing images for similarity.

Determining Color Signatures

Figure 8:
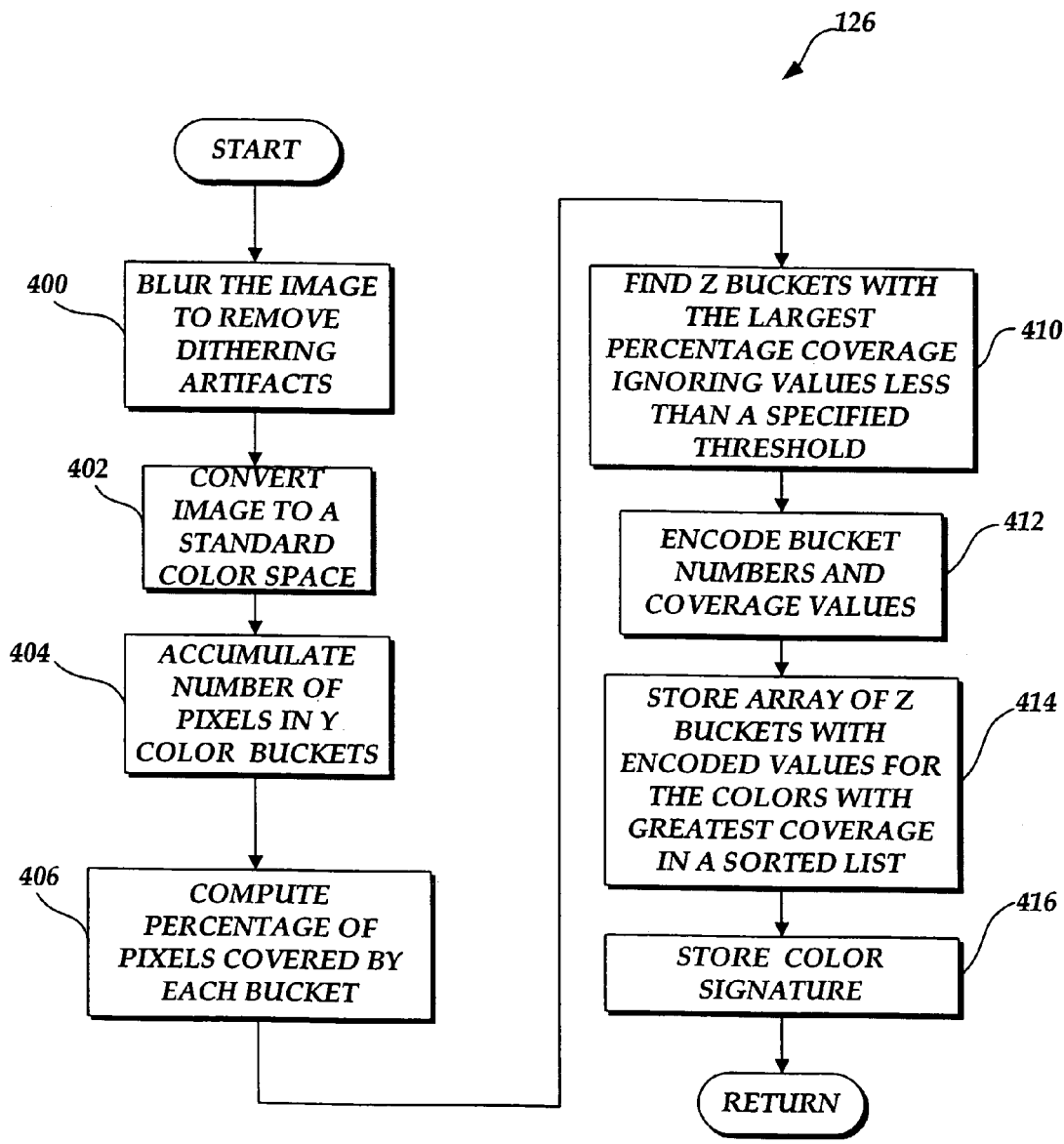
FIG. 8 is a flow diagram illustrating in detail the logic for computing and storing a color signature for an image in accordance with the present invention.

FIG. 8 is a flow diagram illustrating in detail the logic of computing a color signature for an image (block 126 of FIG. 3). The logic moves from a start block to block 400 where the image is blurred to remove dithering artifacts. Preferably, a 3×3 kernel is used to blur the image. Next, in block 402, the image is converted to a standard color space, preferably, HSV (based on Hue, Saturation and Value elements). It will be appreciated that a different color space can be used, for example, RGB (Red, Green, Blue), or HSB (Hue, Saturation, and Blackness elements). The logic then moves to block 404 where pixels are accumulated in color buckets. Preferably the number of color buckets, Y, matches the number of colors in a color identification table. For example, a color identification table may contain the colors: red, orange, yellow, yellow-green, green, green-cyan, cyan, cyan-blue, blue, blue-purple, purple, pink, brown, white, gray, black, and transparent. There should be 17 color buckets for the color identification table described above, one bucket for each entry in the color identification table. Another example of a color identification table contains the entries: light red, dark red, light orange, dark orange, light yellow, dark yellow, light green, dark green, light cyan, dark cyan, light blue, dark blue, light, purple, dark purple, white, gray, black, and transparent. There should be 18 color buckets for the example just described. Using a color identification table, in order for a pixel to be counted, it must be an exact match. This allows for fast computations, however, it may not produce the best results. An extreme case is the comparison of an all red image to an all orange image. While these two images are visually similar they will not be a match. To overcome this problem, an alternative embodiment may use a color cross correlation matrix which specifies weighted values, with high weights for exact color matches, and lower weights for similar colors, such as red and orange. Still referring to FIG. 8 the percentage of pixels covered by each bucket is computed. See block 408. A specified number of buckets, Z, with the largest percentage of coverage are then found. See block 410. Five is a preferable number of buckets because it allows for 1 background color, 1 foreground color and 3 other colors. Preferably, values falling below a specific threshold are ignored. Next, in block 412, bucket numbers and coverage values are encoded, preferably with values ranging from 0 to 255, with 255 representing 100% coverage. Other values, such as a percentage value (0 to 100) could be used. The logic then moves to block 414 where an array of the specified number of buckets, Z, with encoded values for the greatest coverage are stored in a sorted list. The array is 10 bytes, 1 byte for a color value (i.e., a color bucket number), and another byte for the coverage value, for the top five colors. The logic then moves to block 416 where the color signature is stored. The logic of FIG. 8 then ends and processing returns to FIG. 3.

Finding Similar Images Based on Wavelet and Color Signatures

Figure 9:
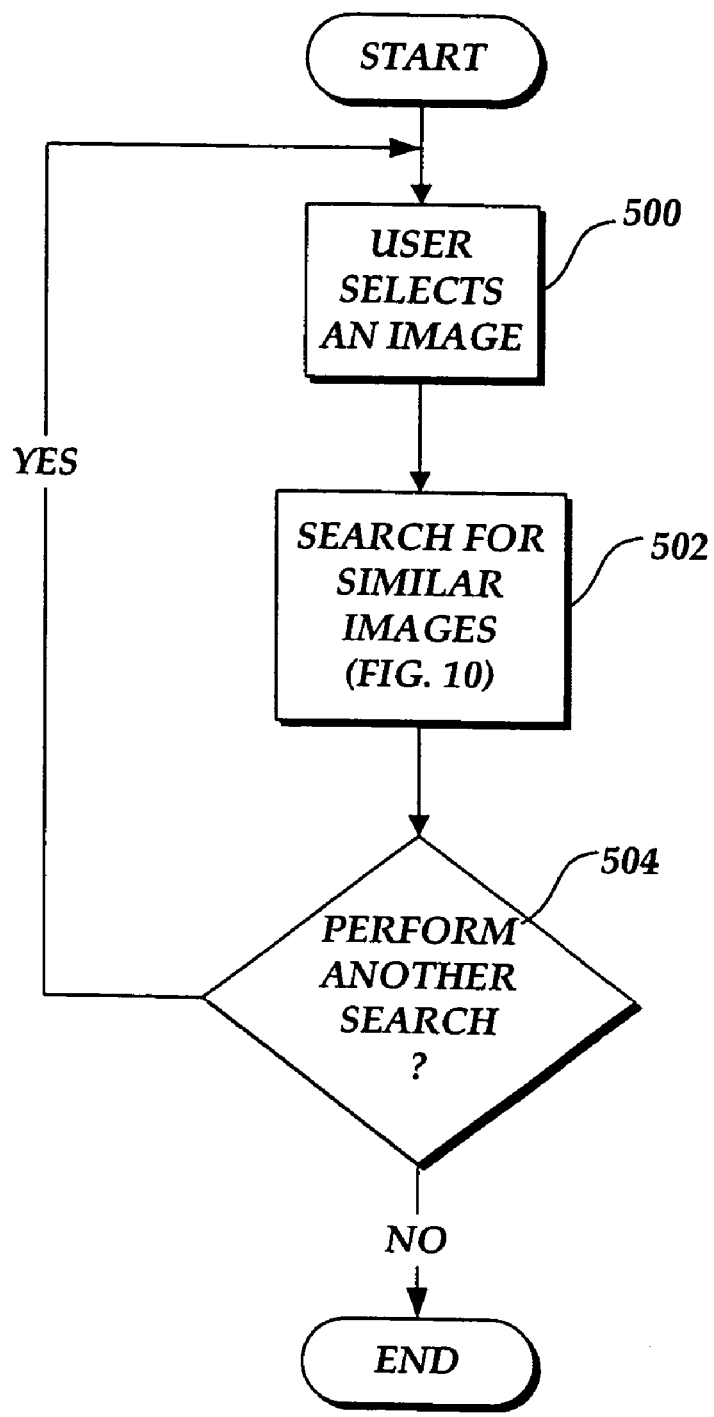
FIG. 9 is a flow diagram illustrating the overall logic of a query for clips similar to a selected clip based on color or shape.

FIG. 9 is a flow diagram illustrating the overall logic of finding images most similar to a selected image, based on the color and/or shape of a selected image. First, in block 500, a user selects an image, preferably via a suitable user interface, for example using the Clip Gallery user interface. Next, in block 502, a search is performed to find images in a clip catalog that are similar to the selected image. The logic of searching for similar images 502 is illustrated in detail in FIG. 10, and described next. After searching for similar images, the logic moves to decision block 504 where a test is made to determine if another search should be performed. If so, the logic returns to block 500. The logic of blocks 500–504 is repeated until it is determined that another search should not be performed, at which point the logic of FIG. 9 of finding similar images ends.

Figure 10:
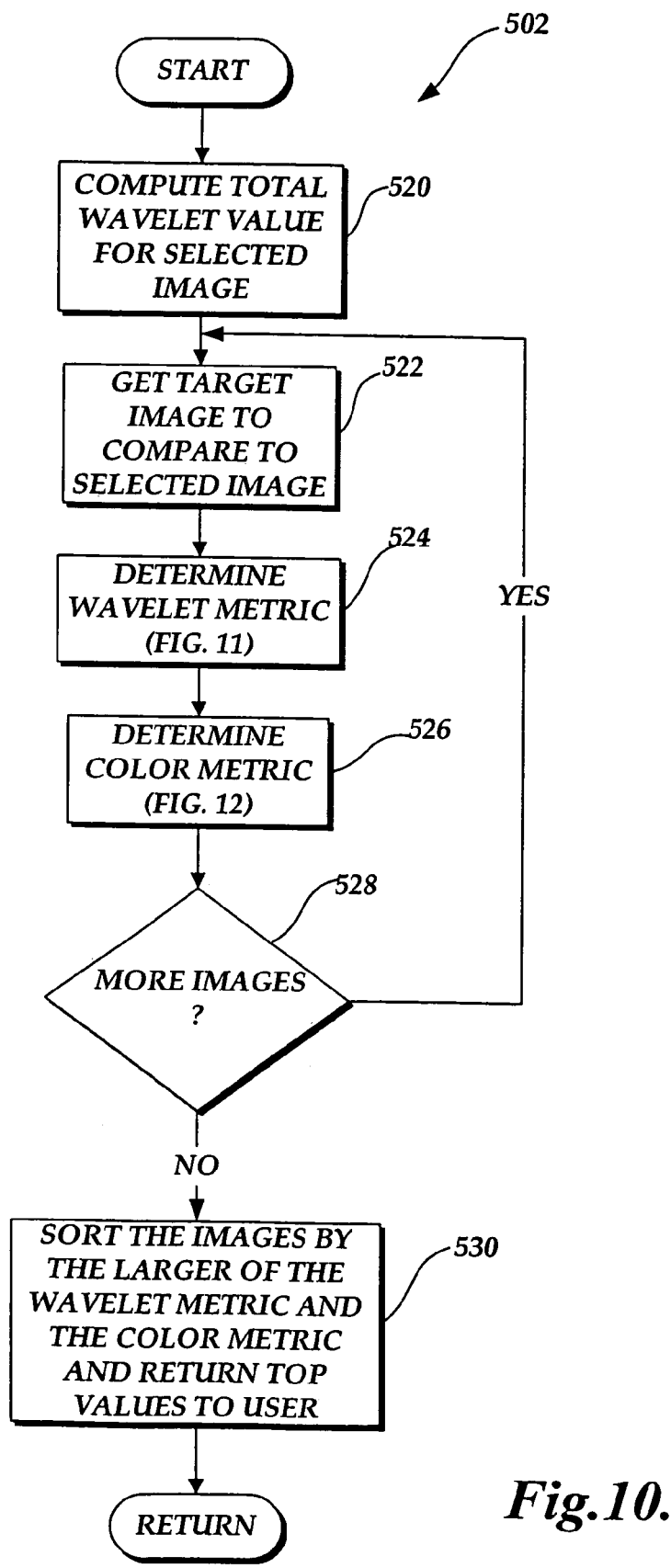
FIG. 10 is a flow diagram illustrating in detail the logic of searching an image catalog for images similar to a selected image.
Figure 11:
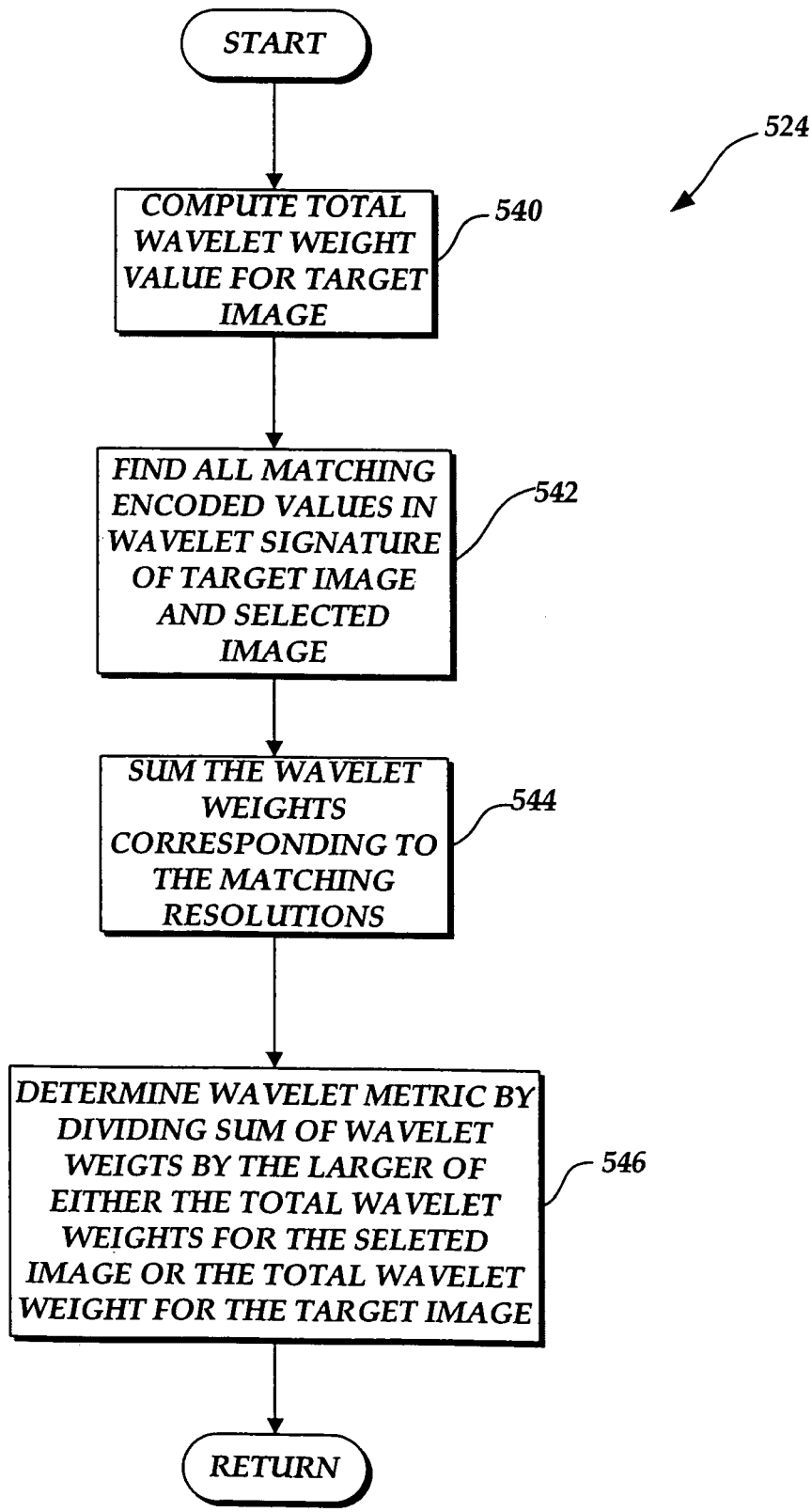
FIG. 11 is a flow diagram illustrating in detail the logic of determining a wavelet metric.

The logic of FIG. 10 of searching for similar images based on color and/or shape moves from a start block to block 520 where the total wavelet value is computed for the selected image. The total wavelet value is computed by summing the weights for the highest, i.e., stored, coefficients. This is clarified by the example illustrated in FIGS. 14A–14C, and described in detail below. The logic of FIG. 10 then moves to block 522 where a target image is retrieved to compare to the selected image. A wavelet metric is determined. See block 524. FIG. 11 illustrates in detail the logic of determining a wavelet metric. Next, in block 526, a color metric is determined. The logic of determining a color metric is illustrated in detail in FIG. 12. The logic then moves to decision block 528 to determine if there are more images. If so, the logic returns to block 522, and the logic of blocks 522–528 is repeated until it is determined in block 528 that there are no more images. When there are no more images, the logic moves to block 530 where images are sorted by the larger of the wavelet metric and the color metric. The images with the largest metric, either wavelet or color, are returned to the user. Preferably, a specified number of images with the largest metric are returned to the user, for example 60. Alternatively, images with metrics over a threshold value could be returned, or a specified amount, such as 60 could be returned, but only if the metric exceeded a threshold value, i.e., at most 60 images are returned. The logic of FIG. 10 then ends, and processing is returned to FIG. 9. While the preferred embodiment illustrated and described selects images with the highest value, either based on color or wavelet, i.e., shape, alternative embodiments could select images based on a combination of color and shape, such as by summing or averaging the color metric and the wavelet metric.

FIG. 11 illustrates in detail the logic of determining a wavelet metric (block 524 of FIG. 10). The wavelet metric is a value indicating how closely a target image matches the selected image based on the shapes of the images. The values range from 0 to 1 with 1 being an exact match. The logic moves from a start block to block 540 where a total wavelet value for the target image is computed by summing the weight values of the target image coefficients. The logic next moves to block 542 where the wavelet signature for the selected image is compared to the wavelet signature for the target image. This is done by finding all matching encoded values in the wavelet signature. When a match is found, the weight value is retrieved from the stored array shown in FIG. 7. The wavelet weights for matches are then summed, in block 544. Next, in block 546 a wavelet metric is determined by dividing the wavelet weight sum computed in block 544 by the larger of the two total wavelet values for the selected image and the target image. The logic of FIG. 11 then ends, and processing returns to FIG. 10.

Figure 12:
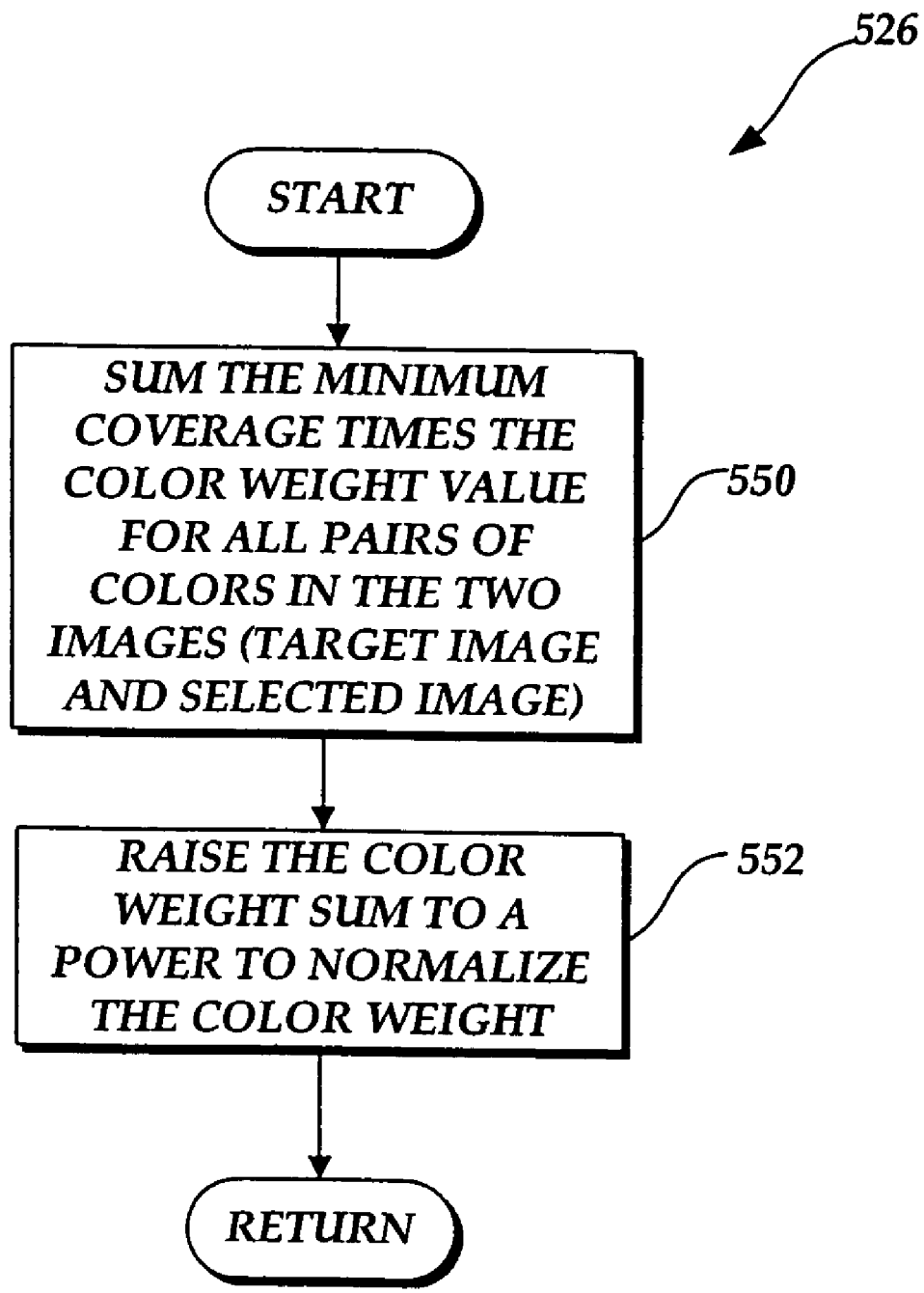
FIG. 12 is a flow diagram illustrating in detail the logic of determining a color metric.
Figure 13:
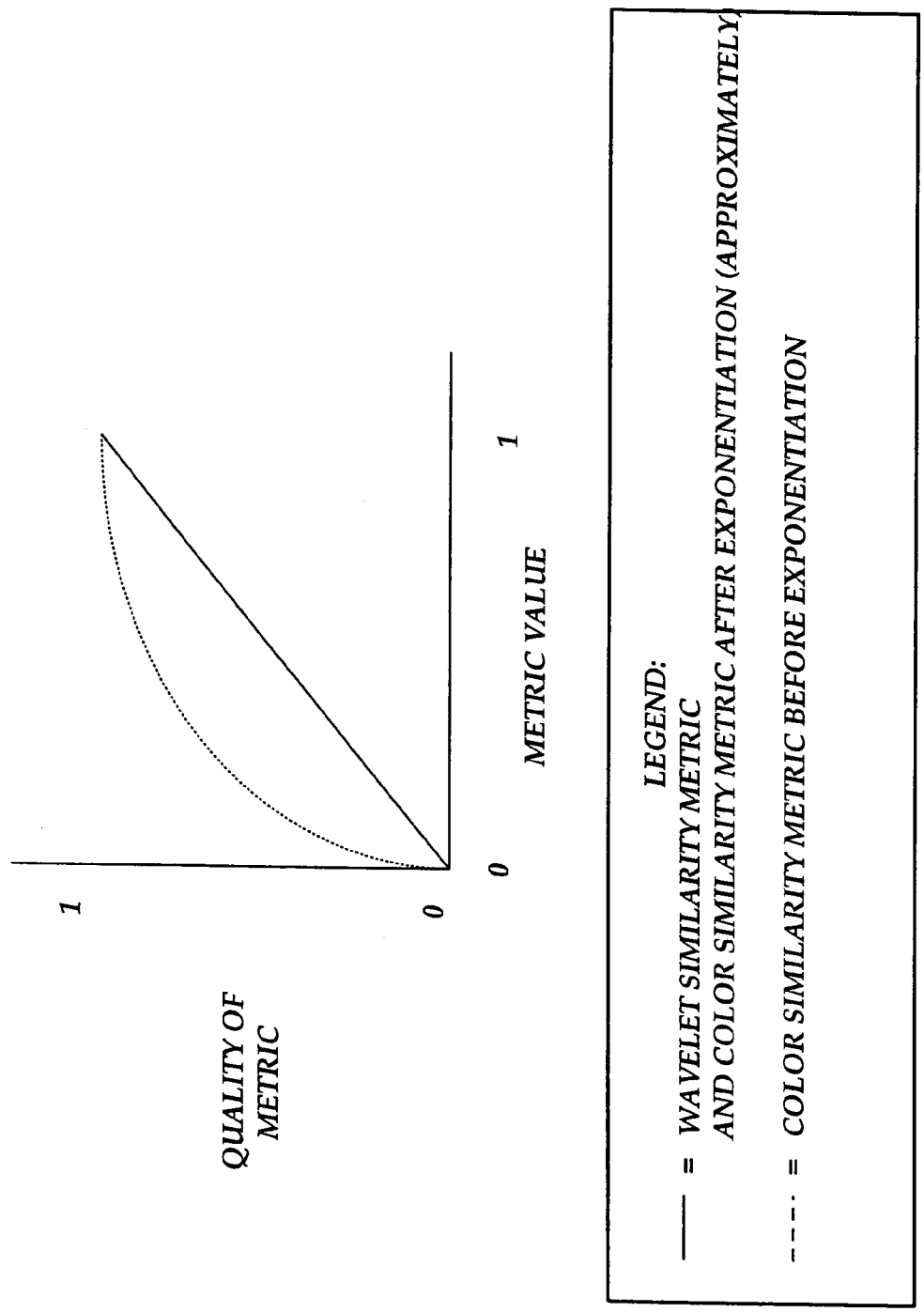
FIG. 13 is a graph of wavelet and color metrics.

FIG. 12 illustrates in detail the logic of determining a color metric (block 526 of FIG. 10). The color metric provides an indication of how closely a target image matches the selected image based on color. The metric value ranges from 0 to 1, with 1 being an exact match. The range values parallel the values for the wavelet metric. This allows for the larger values to be returned to the user, regardless of which metric was used. In this manner, the user is presented with images which most closely match the selected image based on either color or shape. The logic moves from a start block to block 550 where minimum coverage multiplied by the color weight for all pairs of colors in the two images is summed. If a color identification table is used, the weight for an exact match is 1, and non-matching colors have a weight value of 0. If a color cross correlation matrix is used, exact matches and similar matches will have weight values greater than 0, but less than 1 with higher weight values for closer matches. For a given color, the sum of the weight values should equal 1. The color weight sum is then raised to a power, preferably four, to normalize the color weight. This is done to normalize the color metric to more closely resemble the closeness values for shape (wavelet metrics), and is shown in FIG. 13 and described next. The logic of FIG. 12 then ends, and processing returns to FIG. 10.

FIG. 13 is a graph illustrating raising an image to the power of four (block 532 of FIG. 10). The dotted line represents the color metric before exponentiation. The solid line represents the wavelet metric. The solid line also approximates the color metric after exponentiation. As can be seen, the exponentiation changes the color scale to be similar to the wavelet metric.

An Illustrated Example

FIGS. 14A–14C provide an illustrated example of determining wavelet metrics for a selected image and two target images. The illustrate example shows only the 'Y' coefficients. Similar matrices are required for 'I' coefficients and 'Q' coefficients. FIG. 14A represents a simple example of a matrix containing the largest coefficients for the selected image. The coefficients in the illustration are either +1, −1 or 0 (blank). As described earlier, actual coefficient values can be stored, or a +1 or −1 to indicate a large coefficient, either positive or negative, i.e., "large" is based on the absolute value of the coefficient, can be used (FIGS. 14A–14C use the latter method). To determine the total wavelet value for the selected image shown in FIG. 14A, the weight values for each of the coefficients are summed. Since there is one coefficient, +1, in Shell 1, the weight for Shell 1 is retrieved from the stored array. The coefficients illustrated are stored in block 144 of FIG. 4, and the weight values are stored in block 116 of FIG. 3. The weight values for the coefficients are shown in FIG. 7. This process is repeated for all of the stored coefficients, 40 coefficients for 'Y', 40 coefficients for 'I' and 40 coefficients for 'Q'. In the illustrated example of the 'Y' coefficients, there is one coefficient in Shell 1, one coefficient in Shell 2, one coefficient in Shell 3, and one coefficient in Shell 5. Using the weight values of FIG. 7, this yields a total wavelet value of 2660 (830 for the 'Y' coefficient in Shell 1, 1010 for the 'Y' coefficient in Shell 2, 520 for the 'Y' coefficient in Shell 3, and 300 for the 'Y' coefficient in Shell 5). FIGS. 14B and 14C represent target images. A total wavelet value is computed for each target image in the same manner as the selected image (block 540 of FIG. 11). Each target image can be compared to the selected image by determining if there is a match for a given element of the matrix. The match must be exact, i.e., positive coefficient or negative coefficient, i.e., a+1 or −1 for the same element of both the target image matrix and the selected image matrix. Matching elements are underlined in FIGS. 4B and 4C. The matching elements are summed, for example, the sum is 1130 in FIG. 4B and 2360 in FIG. 4C. A match value is then determined by dividing the sum of the matching elements by the larger total wavelet value (selected image or target image). The values (rounded to the nearest thousandth) for the examples illustrated in FIGS. 4B and 4C are underlined and are 0.359 and 0.700, respectively. The shape of the image of FIG. 4C matches the selected image more closely than the image of FIG. 4B.

FIGS. 15A–15C provide an illustrated example of determining color metrics for a selected image and two target images. FIG. 15A shows the 5 colors with the greatest coverage scaled to values between 0 and 255 (i.e., 255 equals 100% coverage), for the selected image. The values are stored in a ten byte array containing a color bucket index and a coverage value, for example, the values shown in FIG. 15A would be stored as {0, 60, 8, 40, 12, 30, 13, 75, 16, 50}. See FIG. 8, block 414. FIGS. 15B and 15C show color coverages for two target images. For each target image, the stored colors with the greatest coverage are compared to the stored colors for the selected image. If there is a match, the smaller coverage value is multiplied by the color weight value. If a color identification table is used, only exact matches will be counted, and the weight value for an exact match is always 1. Alternatively, if a color cross correlation matrix is used, if there is a match, the match can be either exact color or similar color, and the weight value for a match is greater than 0 and less than 1. For the target image illustrated in FIG. 15B, these values add up to 195. This value is then normalized by dividing it by 255. The value is then raised to the fourth power so that the color metric more closely models the wavelet metric, as shown in FIG. 13. The resulting values (rounded to the nearest ten-thousandth) are underlined in the examples illustrated in FIGS. 15B and 15C, and are 0.3420 and 0.4176, respectively. Therefore, the target image of FIG. 15C is more similar in color to the selected image than the target image of FIG. 15B. The illustrated example uses a color identity table, therefore only exact matches are used, with an exact match having a weight value of 1. If a color cross correlation matrix is used similar matches would also be included, but exact matches and similar matches would have weight values of less than 1. For example, in FIG. 15B, in addition to exact matches, similar matches, such as a yellow and a brown match, a brown and red match might also be included. The weight values of the similar matches should be less than those for exact matches. For example, a yellow and brown match may have a weight value of 0.2, whereas an exact brown match may have a weight value of 0.4. The total weight value for all matches for a given color, i.e., exact matches and similar matches must total 1.

In the illustrated example, the wavelet metric for target image 1 is 0.359 and the color metric is 0.3420. The wavelet metric for target image 2 is 0.700 and the color metric is 0.4176. The wavelet metric is larger than the color metric for both of the target images, therefore, the wavelet metric will be used in both cases in determining whether the image should be returned to the user. See FIG. 10, block 530. As mentioned previously, in alternative embodiments, the two metrics (wavelet and color) could be summed or averaged in order to return images that are most similar in both color and shape.

While illustrative embodiments have been illustrated and described, it will be appreciated that various changes can be made therein without departing from the spirit and scope of the invention.

The embodiment of the invention in which an exclusive property or privilege is claimed are defined as follows:

1. A computer-implemented method for finding images, comprising:
computing a first set of signatures that describes shapes in a selected image, the first set of signatures being a set of largest coefficients of a wavelet transform for each color plane of the selected image without calculating types of quantized coefficients;
computing a second signature that describes colors in the selected image; and
finding images that are similar to the selected image using the first set of signatures and the second signature.

2. The method of claim 1, further comprising storing standard color space weight values in an array for retrieval, the array being a table of weights for each color channel.

3. The method of claim 2, wherein the act of computing the first set of signatures includes computing a wavelet signature and storing the wavelet signature for the selected image.

4. The method of claim 1, wherein the acts of computing the first set of signatures and the second signature are executed at any time for all images stored in an image catalog.

5. The method of claim 1, wherein the acts of computing the first set of signatures and the second signature occur whenever an image is added to a clip catalog.

6. The method of claim 1, wherein the acts of computing the first set of signatures and the second signature occur whenever an image in a clip catalog is modified.

7. A computer-readable medium having computer-executable instructions stored thereon for implementing a method for finding images, comprising:
computing a first signature that describes shapes in a selected image without computing quantized coefficients for each subband separately;

computing a second signature that describes colors in the selected image using a color cross correlation matrix which specifies weighted values; and finding images that are similar to the selected image using the first signature and the second signature.

8. The computer-readable medium of claim 7, further comprising storing standard color space weight values in an array for retrieval, the array being a table of weights for each color channel.

9. The computer-readable medium of claim 8, wherein the act of computing the first signature includes computing a wavelet signature and storing the wavelet signature for the selected image.

10. The computer-readable medium of claim 7, wherein the acts of computing the first signature and the second signature are executed at any time for all images stored in an image catalog.

11. The computer-readable medium of claim 7, wherein the acts of computing the first signature and the second signature occur whenever an image is added to a clip catalog.

12. The computer-readable medium of claim 7, wherein the acts of computing the first signature and the second signature occur whenever an image in a clip catalog is modified.

13. A computer-implemented method for finding images, comprising:

computing a wavelet decomposition that contains coefficients for a selected image without using Daubechies orthonormal wavelet filter to obtain subbands;

deriving signatures that describe shapes of the selected image from the coefficients;

computing an image querying metric from the signatures by truncating the coefficients to retain those with the largest magnitude for each color channel; and comparing a number of coefficients a query has in common with target images to find desired images by storing the number of coefficients in a sorted array and linearly comparing the number of coefficients.

14. The method of claim 13, wherein the act of computing the wavelet decomposition includes centering the selected image on a field, the field being white and its dimensions being about 128 pixels by 128 pixels.

15. The method of claim 14, wherein the act of computing the wavelet decomposition includes converting the selected image to a standard color space, wherein the standard color space includes a color space uses by broadcast television.

16. The method of claim 15, wherein the act of computing the wavelet decomposition includes rescaling the colors to produce normalized values.

17. The method of claim 16, wherein the act of computing the wavelet decomposition includes performing a wavelet transform on the normalized values.

18. The method of claim 17, wherein the act of computing the wavelet decomposition includes determining the number of the largest coefficients by using magnitude for each color plane.

19. The method of claim 18, wherein the act of computing the wavelet decomposition includes truncating a sequence of coefficients to retain coefficients with the largest magnitude.

20. The method of claim 19, wherein the act of computing the wavelet decomposition includes encoding row and column locations of coefficients by increasing the resolution.

* * * * *